Oct. 14, 1924.　　　　　E. B. STIMPSON　　　　　1,511,688

TWO-PIECE RIVET

Original Filed Sept. 28, 1921

Edwin B. Stimpson INVENTOR
BY
Frank J. Kent ATTORNEY

Patented Oct. 14, 1924.

1,511,688

UNITED STATES PATENT OFFICE.

EDWIN B. STIMPSON, OF BROOKLYN, NEW YORK, ASSIGNOR TO EDWIN B. STIMPSON COMPANY, OF BROOKLYN, NEW YORK.

TWO-PIECE RIVET.

Original application filed September 28, 1921, Serial No. 503,863. Divided and this application filed December 21, 1923. Serial No. 681,969.

*To all whom it may concern:*

Be it known that I, EDWIN B. STIMPSON, a citizen of the United States, residing at Brooklyn, in the county of Kings and State of New York, have invented certain new and useful Improvements in Two-Piece Rivets, of which the following is a specification.

This invention relates generally to rivet constructions and more particularly to rivets of the interengaging double-stud type. This application is in the nature of a division of my prior application Serial No. 503,863, filed Sept. 28, 1921.

The invention consists in a pair of complementary formed rivet members one of which is a longitudinally slotted or double-pronged stud having an inclined or sloping surface constituting the closed end of the slot. The other stud member is of a rounded or pin type adapted to enter the slot of the double-pronged unit and to have the end portion of the pin deflected laterally into clinching engagement with the goods. The pin stud is provided with an annular inclined shoulder formed to deflect outwardly in opposite directions the end portions of the prongs of the slotted or double-pronged rivet member.

In the drawings, in which a preferred form of the invention has been selected for illustration, Figure 1 is a compound view shown in plan and in side elevation and representing a pin type rivet member embodying part of the invention.

Figure 1:
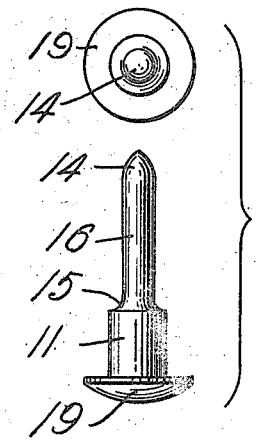

Referring to the drawings for a more detailed description of the invention, a two-part rivet structure is shown which includes a split rivet stud member 10 and a cooperating pin rivet stud member 11, the two stud members being so formed and related to each other that they can be pressed into mutual engagement to provide a double anchoring or clinching effect in the material in which the rivet is set.

This useful effect is obtained by so forming the interengaging stud end portions as to cause them to bend laterally into clinching engagement with the material through a camming or diverting action produced by the engagement of the rivet studs with each other. For this purpose each stud is provided with an oblique directing portion which is arranged to be engaged by the end portion of the other stud member.

Figure 2:
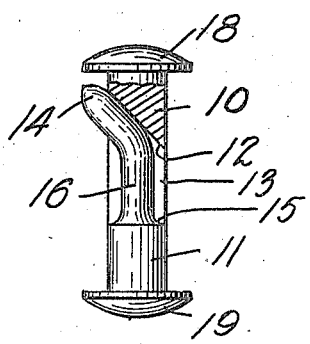
Figure 2 is a view in side elevation and partly broken away of the improved rivet construction in assembled or set condition.

The directing or clinch forming portion of the split stud member 10 resides in an oblique or diagonally formed area 12 which constitutes the base or closed end of the slot 13 which produces the split stud effect. The diagonal wall thus formed is arranged to be engaged by the tapered end portion 14 of the pin stud 11 is indicated in Figure 2 of the drawing for the purpose of diverting the tapered end portion 14 laterally as indicated in this figure. It will be seen that the lateral projection of the end portion 14 of the pin stud 11 beyond the side wall of the double or split stud 10 provides an anchor which prevents the withdrawal of the pin stud from its seat in the material in which it has been placed.

Figure 3:
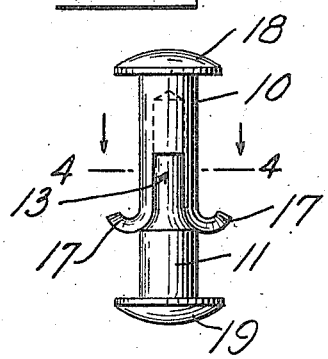
Figure 3 is a view in side elevation of the rivet shown in Figure 2 taken at right angles thereto.
Figure 4:
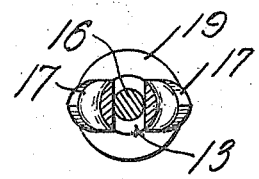
Figure 4 is a view in cross-section taken on the lines 4—4 of Figure 3.

A similar effect is produced with the other rivet stud member 10 by the provision of a sloping or oblique shoulder portion 15 at the junction of the rounded and reduced pin portion 16 of the pin stud 11 with the larger main body portion of the stud. This rounded shoulder portion serves to divert the end portions 17 of the split stud 10 into outwardly curved position such as is shown in Figure 3 of the drawing. It will be seen that this curved or hooked condition of the end portions 17 of the split stud 10 provides an exceedingly effective anchorage which prevents the pulling of the split stud 10 from its position in the material.

It will be seen that with the construction described the pin stud member 11 is forced into the slot of the split stud member 10 until the end portion 14 of the pin stud is deflected laterally against the sloping shoulder or end 12 of the split stud member 10 while at the same time the end portions 17 of the split stud member engage and are deflected outwardly by the annular inclined shoulder 15 at the base of the pin portion of the stud 11. It will be seen that the anchorage effected by the lateral projection of the end portion 14 of the pin stud plus the opposite lateral projection of the end portions 17 of the prongs of the split stud 10 is effective to prevent the pulling of the stud members from their position. Preferably the diameter of the pin portion 16 of the stud 11 is substantially the same as the space separating the prongs of the split stud 10 so that in addition to the anchoring effect referred to the advantage of the frictional engagement of the two studs with each other is obtained to still further increase the anchoring effect produced. It will be clear that in practice the head portions 18 and 19 of the rivet members are brought into engagement with the opposite outer faces of the sheets of material which are held together by the use of the rivet structure described.

What I claim is:—

1. A two-piece rivet comprising a stud having a shank longitudinally slotted to provide double prongs, the closed end of the slot being inclined with relation to the longitudinal axis of the shank, and a stud having a pin-shaped shank adapted to be received in the slot of the double-pronged stud and to have its end deflected laterally by engagement with the inclined closed end of the slot.

2. A two-piece rivet comprising a stud having a shank longitudinally slotted to provide double prongs, the closed end of the slot being inclined with relation to the longitudinal axis of the shank, and a stud having a rounded pin shank with a tapered end portion, said shank being formed to be received in the slot of the double pronged stud and to have its end deflected laterally by engagement with the inclined closed end of the slot.

3. A two-piece rivet comprising a stud having a shank longitudinally slotted to provide double prongs, the closed end of the slot being inclined with relation to the longitudinal axis of the shank, and a stud having a pin-shaped shank adapted to be received in the slot of the double-pronged stud, said pin-shaped shank being provided with an annular inclined shoulder for deflecting the end portions of the double prongs outwardly.

4. A two-piece rivet comprising a stud having a shank longitudinally slotted to provide double prongs, the closed end of the slot being inclined with relation to the longitudinal axis of the shank, and a complementary stud having a rounded pin shank with a pointed end and an annular shoulder adjacent the base of the shank.

5. A two-piece rivet comprising a stud having a shank longitudinally slotted to provide double prongs, the closed end of the slot being inclined with relation to the longitudinal axis of the shank, a stud having a rounded pin shank with a tapered end portion, said shank being formed to be received in the slot of the double pronged stud and to have its end deflected laterally by engagement with the inclined closed end of the slot, and said pin-shaped shank being provided with an annular inclined shoulder for deflecting the end portions of the double prongs outwardly.

In testimony whereof I affix my signature.

EDWIN B. STIMPSON.